United States Patent [19]

Eckstein

[11] Patent Number: 5,189,188

[45] Date of Patent: Feb. 23, 1993

[54] BIS(TRIARYLMETHANE) COMPOUNDS

[75] Inventor: Udo Eckstein, Cologne, Fed. Rep. of Germany

[73] Assignee: Bayer Aktiengesellschaft, Leverkusen, Fed. Rep. of Germany

[21] Appl. No.: 607,192

[22] Filed: Oct. 31, 1990

[30] Foreign Application Priority Data

Dec. 7, 1989 [DE]  Fed. Rep. of Germany ....... 3940478

[51] Int. Cl.$^5$ ........................................... C07C 211/55
[52] U.S. Cl. .................................. 552/104; 552/105;
552/110; 544/38; 544/79; 544/102; 544/347;
546/166; 546/186; 546/187; 548/444; 548/455;
548/517; 548/523
[58] Field of Search ................ 564/321, 327; 552/104,
552/105, 110

[56] References Cited

U.S. PATENT DOCUMENTS 4,223,144  9/1980  Kast et al. ............................ 544/392

FOREIGN PATENT DOCUMENTS 2401958  3/1979  France .

Primary Examiner—Richard L. Raymond
Attorney, Agent, or Firm—Sprung Horn Kramer & Woods

[57] ABSTRACT

Compounds of the general formula

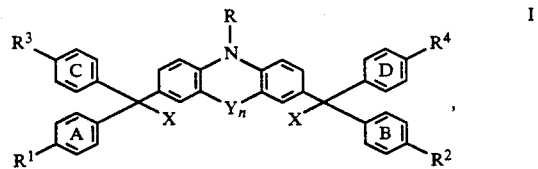

in which the symbols have the meaning given in the description, are highly suitable as color formers in recording materials based on acid developers. They give deep blue, green-blue, green, violet or red shades which have excellent sublimation and light fastness.

5 Claims, No Drawings

BIS(TRIARYLMETHANE) COMPOUNDS

The invention relates to compounds of the general formula

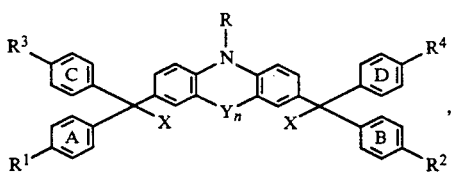

in which—independently of one another

X is hydroxyl, alkoxy, alkenyloxy, aralkoxy, cycloalkoxy, aryloxy, acyloxy, alkylamino, dialkylamino, acylamino, aralkylamino or arylamino, Y is a direct bond, oxygen, sulphur or N-R, R is alkyl, alkenyl or aralkyl, $R^1$ and $R^2$ are alkoxy, aralkoxy, aryloxy or a radical of the formula

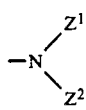

$R^3$ and $R^4$ are hydrogen, halogen, alkyl, alkoxy, aralkyl, aralkoxy, aryloxy or a radical of the formula

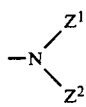

$Z^1$ and $Z^2$ are alkyl, aryl, cycloalkyl or aralkyl and substituents of the rings, also alkyl, aryl, aralkyl, alkenyl or arylvinyl.

Alkyl represents $C_1$-$C_{30}$-alkyl, in particular $C_1$-$C_{12}$alkyl.

The alkyl radicals and the alkyl radicals in alkoxy, alkylthio, alkylamino, alkanoylamino, alkylsulphonyl and alkoxycarbonyl groups can be branched and substituted, for example by fluorine, chlorine, $C_1$-$C_4$-alkoxy, cyano or $C_1$-$C_4$-alkoxycarbonyl.

Aralkyl is in particular phenyl-$C_1$-$C_4$-alkyl which can be substituted in the phenyl ring by halogen, $C_1$-$C_4$-alkyl and/or $C_1$-$C_4$-alkoxy.

Cycloalkyl is in particular cyclopentyl or cyclohexyl which is unsubstituted or substituted by methyl.

Alkenyl is in particular $C_2$-$C_5$-alkeny, which can be monosubstituted by hydroxyl, $C_1$-$C_4$-alkoxycarbonyl, chlorine or bromine. Vinyl and allyl are preferred.

Halogen is in particular fluorine, chlorine and bromine, preferably chlorine.

Aryl is in particular phenyl or naphthyl which is unsubstituted or substituted by one to three $C_1$-$C_4$-alkyl, chlorine, bromine, cyano, $C_1$-$C_4$-alkoxycarbonyl or $C_1$-$C_4$-alkoxy.

Alkoxy is in particular $C_1$-$C_{12}$-alkoxy which is unsubstituted or substituted by chlorine or $C_1$-$C_4$-alkoxy.

Acyl is in particular $C_1$-$C_4$-alkylcarbonyl and $C_1$-$C_4$-alkoxycarbonyl or aminocarbonyl or aminosulphonyl which is unsubstituted or mono- or disubstituted by $C_1$-$C_4$-alkyl, phenyl or benzyl.

Alkoxycarbonyl is in particular $C_1$-$C_4$-alkoxycarbonyl which is unsubstituted or substituted by hydroxyl, halogen or cyano.

The rings can be substituted by nonionic substituents, in particular by $C_1$-$C_4$-alkyl, $C_1$-$C_4$-alkoxy, cyano, nitro or halogen.

Of the compounds of the formula I, the compounds of the formula

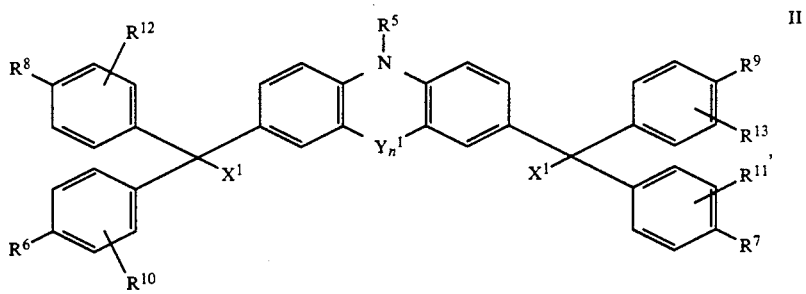

n is 0 or 1, it being possible for further isocyclic or heterocyclic rings to be fused with rings A, B, C and D and for the cyclic and acyclic radicals and rings A, B, C and D to carry further nonionic substituents customary in dyestuff chemistry, and to their preparation and their use as colour formers in pressure-sensitive and thermo-reactive recording materials.

Examples of nonionic substituents customary in dyestuff chemistry are halogen, hydroxyl, alkoxy, alkenyloxy, aryloxy, aralkoxy, cycloalkyloxy, alkylcarbonyloxy, arylcarbonyloxy, aryl, alkylmercapto, arylmercapto, aralkylmercapto, alkylsulphonyl, cyano, carbamoyl, alkoxycarbonyl, amino which can be substituted by 1 or 2 alkyl, cycloalkyl, aryl or aralkyl groups or the substituents of which can be ring-closed, preferably to form a 5- or 6-membered ring, acylamino, and, as are of particular importance, in which—independently of one another $X^1$ is hydroxyl or $C_1$-$C_{12}$-alkoxy or benzyloxy which is unsubstituted or substituted by $C_1$-$C_4$-alkoxy or chlorine, $Y^1$ is a direct bond, oxygen or N-$R^5$, $R^5$ is $C_1$-$C_{12}$-alkyl or benzyl, $R^6$ and $R^7$ are unsubstituted or chlorine- or $C_1$-$C_4$-alkoxy substituted $C_1$-$C_{12}$-alkoxy, benzyloxy, phenoxy or a radical of the formula

$R^8$ and $R^9$ are hydrogen, chlorine, unsubstituted or chlorine- or $C_1$-$C_4$-alkoxy- substituted $C_1$-$C_{12}$-alkyl, unsubstituted or chlorine- or $C_1$-$C_4$-alkoxy-substituted $C_1$-$C_{12}$-alkoxy, benzyl, phenoxy or a radical of the formula

$R^{10}$, $R^{11}$, $R^{12}$ and $R^{13}$ are hydrogen, chlorine, $C_1$-$C_{12}$-alkyl, $C_1$-$C_{12}$-alkoxy, phenoxy, benzyloxy or a radical of the formula

n is 0 or 1, $Z^3$ and $Z^4$ are unsubstituted or chlorine-, cyano-, $C_1$-$C_4$-alkoxycarbonyl- or $C_1$-$C_4$-alkoxy-substituted $C_1$-$C_{12}$-alkyl, cyclohexyl, phenyl or benzyl, which can be substituted by chlorine, $C_1$-$C_{12}$-alkyl or $C_1$-$C_{12}$-alkoxy, or $R^6$ with $R^{10}$, $R^7$ with $R^{11}$, $R^8$ with $R^{12}$, $R^9$ with $R^{13}$ with the inclusion of the benzene ring carrying them can form a ring system of the formula

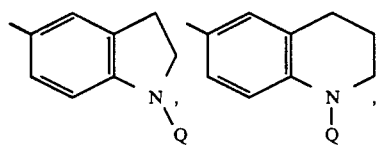

or

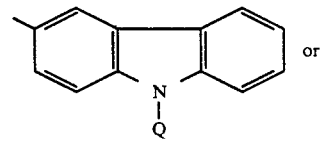

in which

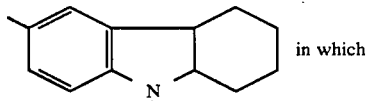

Q represents $C_1$-$C_{12}$-alkyl which can be substituted by chlorine, cyano, $C_1$-$C_4$-alkoxycarbonyl or $C_1$-$C_4$-alkoxy, cyclohexyl, phenyl or benzyl, which can be substituted by chlorine, $C_1$-$C_{12}$-alkyl or $C_1$-$C_{12}$-alkoxy, and the saturated ring moiety can carry up to four radicals from the group comprising chlorine, $C_1$-$C_4$-alkyl, $C_1$-$C_4$-alkoxy or phenyl, or is $$-N\begin{matrix}Z^3\\Z^4\end{matrix}$$

an unsubstituted or chlorine-, $C_1$-$C_4$-alkyl- or phenyl-substituted pyrrolo, pyrrolidino, piperidino, pipecolino, morpholino, pyrazolo or pyrazoline radical.

Examples of radicals substituted in the saturated ring are:

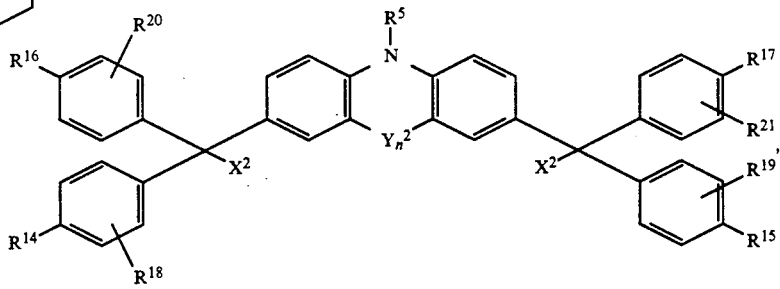

and

The compounds of the formula

III in which—independently of one another
$X^2$ is hydroxyl or $C_1$-$C_{12}$-alkoxy,
$Y^2$ is a direct bond,
$R^{14}$ and $R^{15}$ are $C_1$-$C_{12}$-alkoxy, benzyloxy or a radical of the formula

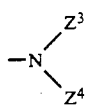

$R^{16}$ and $R^{17}$ are hydrogen, chlorine, $C_1-C_{12}$-alkyl, $C_1-C_{12}$-alkoxy, benzyloxy or a radical of the formula

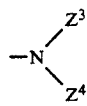

$R^{18}$, $R^{19}$, $R^{20}$ and $R^{21}$ are hydrogen, chlorine, $C_1-C_{12}$-alkyl, $C_1-C_{12}$-alkoxy, $C_1-C_4$-alkylamino or di-$C_1-C_4$-alkylamino or $R^{14}$ and $R^{15}$ together with the benzene ring to which they are bound can form a ring system of the formula

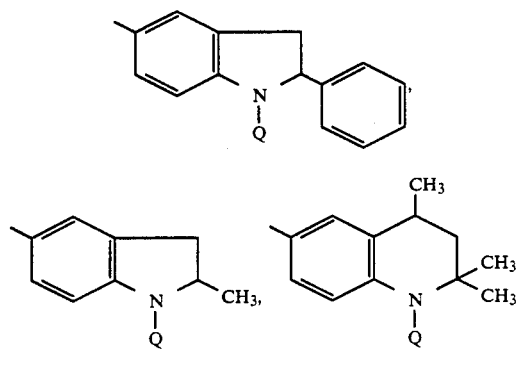

or

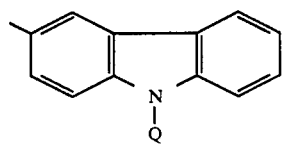

in which $R^5$, Q, $Z^3$, $Z^4$ and n have the abovementioned meaning are particularly preferred.

The symmetrical compounds of the formula III are very particularly preferred.

The compounds of the formula I can be prepared by processes known per se. One process comprises, for example, reacting dyestuff salts of the formula

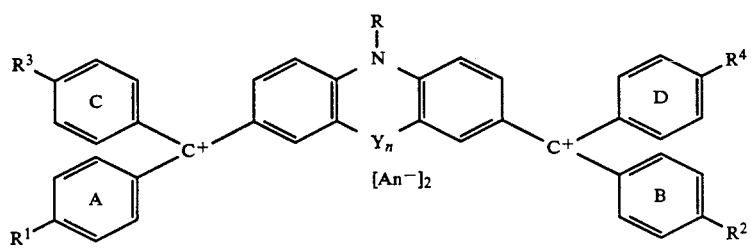

with the bases of the formula MeX (V), in which R, $R^1$–$R^4$, X, Y, n and the rings A, B, C and D have the abovementioned meaning, and Me is an alkali metal or an alkaline earth metal, in particular sodium or potassium and $An^-$ is an anion from the series comprising chloride, bromide, acetate, sulphate, phosphate or p-toluenesulphonate, in an organic solvent suitable for the reaction. If appropriate, after the solvent has been removed, the mixture is then poured into water, and the compounds of the formula I are isolated.

Suitable reaction media are polar solvents, such as dimethylformamide, dimethyl sulphoxide, hexamethylphosphoric triamide and alkanols. Dimethylformamide and $C_1-C_{18}$-alkanols are preferred.

Suitable reaction temperatures are between 20 and 120° C., 30 to 80° C. being preferred.

A particularly advantageous preparation process comprises condensing in a one-pot reaction a total of 2 mol of the ketones of the formulae

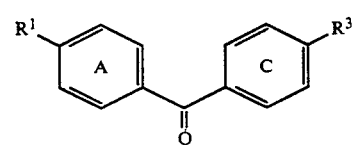

and

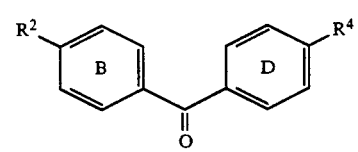

either simultaneously or successively with 1 mol of amine of the formula

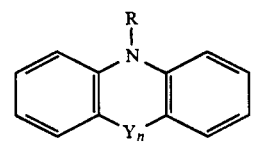

or 1 mol of diketone of the formula

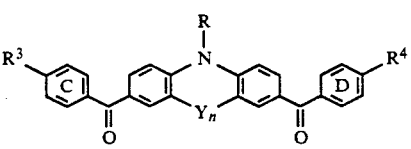

with a total of 2 mol of amine of the formulae

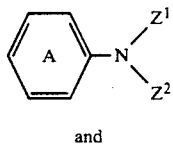

X and

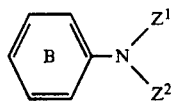

XI in the presence of a condensating agent supplying an anion An⁻ to give the dyestuff salts of the formula IV and reacting these intermediates without isolation with the bases V, as described above.

Preferably, phosphorus oxychloride and/or diphosphorus pentoxide are used as condensating agents.

The compounds of the formula I obtained can be marketed without further purification, for example as colour formers, and used in pressure-sensitive recording materials, in particular in microencapsulated materials.

The compounds of the formula I according to the invention are usually colourless or at most weakly coloured and show very good solubility in solvents customary for encapsulation, such as, for example, (chlorinated) hydrocarbons, phthalic esters, or also in vegetable oils.

On contact with an acid developer, i.e. an electron acceptor, they produce deep blue, green-blue, green, violet or red shades which have excellent sublimation and light fastness. By mixing them with one another, navy, grey or black colorations can be obtained.

They are also of value in a mixture with one or more other known colour formers, for example 3,3-bis(aminophenyl)phthalides, 3,3-bis(indolyl)phthalides, 3-aminofluorans, 2,6-diaminofluorans, leukoauramines, spiropyrans, spirodipyrans, chromenoindoles, phenoxazines, phenothiazines, carbazolylmethanes or other triarylmethane leuko dyestuffs to give green, violet, blue, navy, grey or black colorations.

They show high colour intensity, excellent light fastness and excellent aging and CB stability not only on phenolic substrates but also on salicylate and activated clays. They are suitable for pressure-sensitive recording material, which can also be used as copying materials. Their development rate differs as a function of the substituents. However, in general, they are distinguished by a high development rate in combination with reduced sensitivity of the recording materials to unintended premature development.

Moreover, the colour formers of the formula I have a particularly advantageous migration behaviour by virtue of their minimal diffusion through the capsule material of the microcapsules.

The solubility of the colour formers is increased by substitution with long-chain alkyl radicals to such an extent that highly concentrated solutions in the solvents suitable for microencapsulation can be prepared even from the less soluble compounds.

Pressure-sensitive recording materials are disclosed, for example, in U.S. Pat. Nos. 2,800,457 and 2,800,458.

EXAMPLE 1

26.8 g (0.19 mol) of phosphorus pentoxide, 98.5% pure, are added in portions to a solution of 32.2 g (0.13 mol) of 4,4'-dimethoxybenzophenone, 97.8% pure, in 143.5 g (0.94 mol) of phosphorus oxychloride. Finally 12 g (0.065 mol) of N-methyldiphenylamine, 99% pure, are added dropwise to this mixture at room temperature over a period of 30 minutes. The mixture is heated to 90° C. and stirred at this temperature for 18 hours. The melt cooled to 20°–25° C. is slowly poured into 500 ml of water and 150 ml of toluene with thorough stirring that the temperature does not exceed 60° C. The pH is adjusted to a value between 8.5 and 9 by slowly adding 600 g (7.5 mol) of 50% strength sodium hydroxide solution. The mixture is stirred at 60° C. for 6 hours. The organic phase forming at the top is then separated off. At a water pump vacuum of 18 to 20 mbar and up to a temperature of 60° C., toluene and residual water are removed azeotropically from the separated organic phase. This gives 40.8 g of a pale pink resin, which slowly crystallizes completely, of melting point 68°–75° C. and the formula:

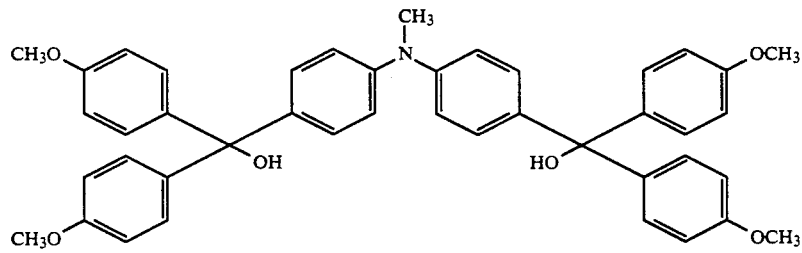

1

The colour former can be recrystallized from di-sec.-butyl ether; melting point: 78°–80° C.

A solution in glacial acetic acid shows a deep red-violet colour at a $\lambda_{max}$ of 556 nm and $\lambda_2$ of 430 nm. The colour former is readily soluble up to 30% indiisopropylnaphthalene, chlorinated paraffin ($C_{12}$–$C_{18}$-n-paraffin, ≈45% of chlorine), sesame oil or linseed oil and can be diluted to concentrations used in recording materials of 3%, 5% or 7%.

Red-violet shades of high colour strength and high light fastnesses are obtained on acid clay and bisphenol A.

When incorporated in microcapsules whose shells are made of polyaddition products of polyisocynates with polyamines, the colour former also shows no appreciable migration at elevated temperatures, which is particularly advantageous.

EXAMPLE 2

The procedure as described in the above example is repeated, using only 24 g (0.0975 mol) of 4,4'-dimethoxybenzophenone instead of 32.2 g (0.13 mol), to give 39.2 g of a pale pink resin, which according to HPLC consists of a mixture of about 50% of bis(triarylmethane) colour former of the formula 1 and about 50% of the mono(triarylmethane) colour former of the formula residue is dried at 30° C. in vacuo to give 25.5 g (91.9% of theory) of a grey powder of melting point 65°–67° C. and the formula

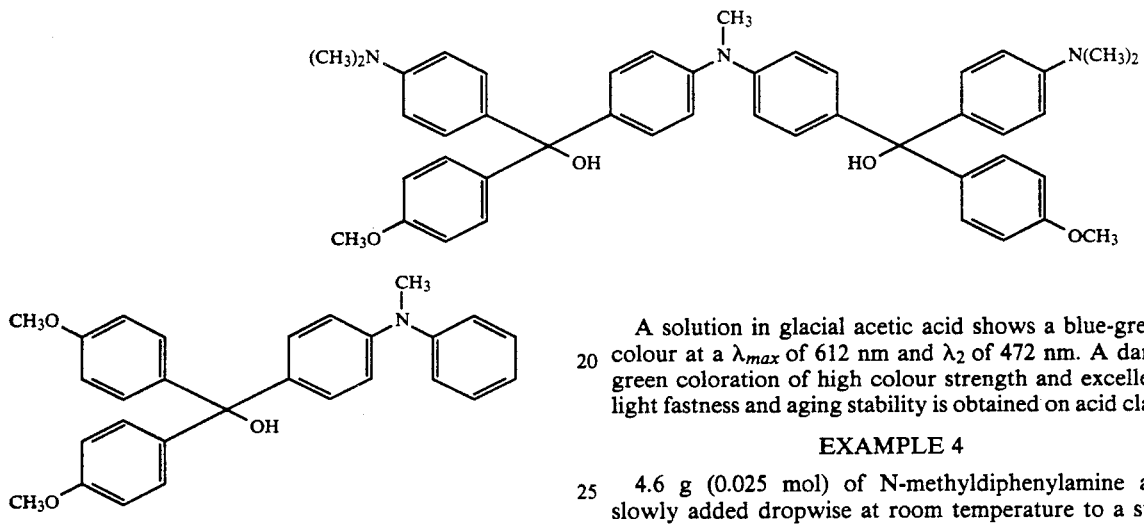

and likewise shows a red-violet shade of high colour strength and very good migration behaviour on acid clay and phenolic resin.

EXAMPLE 3

25.5 g (0.1 mol) of 4-methoxy-4′-dimethylaminobenzophenone and 9.2 g (0.05 mol) of N-methyldiphenylamine are suspended in 110.6 g (0.72 mol) of phosphorus oxychloride, and 19.9 g (0.14 mol) of phosphorus pentoxide are added at room temperature. The melt is stirred at 70° C. for 12 hours and poured into 800 ml of ice water. The pH is adjusted to 2 with about 100 ml of 30% strength sodium hydroxide solution, and 200 ml of 2% strength sodium chloride solution are added. Stirring at room temperature is continued until the dyestuff precipitates in the form of crystals. It is filtered off with suction, washed with water and dried in vacuo at 40° C. to give 31 g (85% of theory) of blackish crystals of melting point 124°–28° C.

25 g (0.19 mol) of 30% strength sodium hydroxide solution are slowly added dropwise at 50° C. to the suspension of 29.3 g (0.04 mol) of this dyestuff in 150 mol of toluene and 200 ml of water. The mixture is stirred at this temperature for 20 hours until the organic phase is decolorized. The organic phase is separated off, and the solvent and a small amount of residual water are removed azeotropically at a water pump vacuum. The A solution in glacial acetic acid shows a blue-green colour at a $\lambda_{max}$ of 612 nm and $\lambda_2$ of 472 nm. A dark-green coloration of high colour strength and excellent light fastness and aging stability is obtained on acid clay.

EXAMPLE 4

4.6 g (0.025 mol) of N-methyldiphenylamine are slowly added dropwise at room temperature to a suspension of 11.3 g (0.05 mol) of 4-dimethylaminobenzophenone and 10.7 g (0.075 mol) of phosphorus pentoxide in 38.5 g (0.25 mol) of phosphorus oxychloride. The mixture is heated to 90° C. and stirred at this temperature for 17 hours. The melt is cooled to room temperature and then poured into 600 ml of ice water. After stirring for 12 hours, the bright crystals are filtered off with suction. Drying at 30° C. in vacuo gives 25.7 g (76.6% of theory) of melting point 126°–30° C.

25.4 g (0.04 mol) of this dyestuff are dissolved in 100 ml of dimethylformamide. 16 g (0.12 mol) of 30% strength sodium hydroxide solution are slowly added dropwise at room temperature to the solution. Stirring at 60° C. is continued for 5 hours, the product is filtered off, and the filtrate is poured into 250 ml of ice water. After the addition of 25 g of sodium chloride, the resulting precipitate is filtered off with suction, washed with water and dried. Yield: 18.5 g (79.2% of theory) of a light grey crystalline powder of melting point 52°–56° C. and the formula

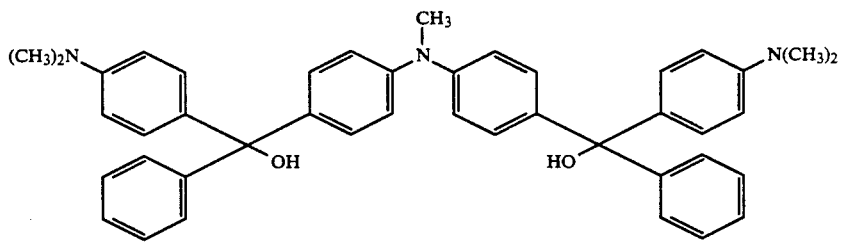

A solution in glacial acetic acid shows a green colour at a $\lambda_{max}$ of 622 nm and $\lambda_2$ of 427 nm.

Malachite-green shades of high colour strength and very good CF and CB stabilities are obtained on acid clay, salicylate and phenolic resin.

Analogous to Example 1–4, the following colour formers listed in the table are also prepared:

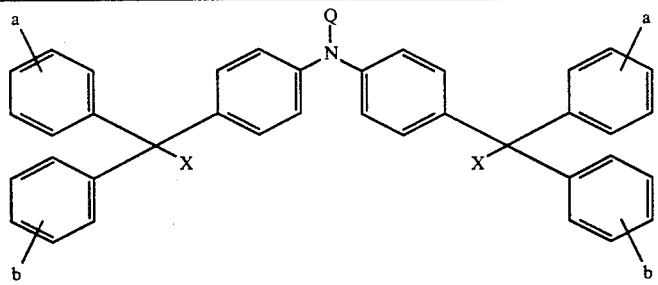

| Example | a | b | Q | X | Shade on acid clay |
|---|---|---|---|---|---|
| 5 | 4-$OCH_3$<br>3-$OCH_3$ | 4-$OCH_3$ | $CH_3$ | $OCH_3$ | violet |
| 6 | 4-$OCH_3$<br>3-$OCH_3$ | 3-$OCH_3$ | $CH_3$ | $OC_3H_7$ | violet |
| 7 | 4-$OCH_3$<br>2-$OCH_3$ | 4-$CH_3$ | $C_4H_9$-n | OH/$OCH_3$ | red-violet |
| 8 | 4-$OCH_3$<br>3-$OCH_3$ | 4-Cl | $CH_2$—$C_6H_5$ | $OC_4H_9$ | orange-red |
| 9 | 4-$OC_2H_5$ | 2-$OCH_3$<br>4-$CH_3$<br>5-Cl | $C_2H_5$ | $OC_2H_5$ | wine red |
| 10 | 4-$OC_2H_4OCH_3$ | 4-$CH_3$ | $C_3H_7$ | OH | red-violet |
| 11 | 4-$SCH_3$ | 4-$OCH_3$ | $CH_2$—$C_6H_5$ | $OCH_2$—$C_6H_5$ | dark red-blue |
| 12 | 4-$N(C_2H_5)_2$<br>2-$OC_2H_5$ | 4-$OC_2H_5$ | $CH_3$ | $OCH_3$ | blue-green |
| 13 | 4-$(N(C_2H_5)_2$ | 4-Cl | $C_3H_7$ | $OC_3H_7$ | dark green |
| 14 | 4-N—$C_2H_5$<br>    \|<br>    $CH_2$—$C_6H_5$ | 2-Cl | $C_6H_{13}$ | $OC_6H_{13}$ | blue-green |
| 15 | H | 4-N($C_2H_5$)(2-) phenyl | $CH_3$ | OH | dull blue-green |
| 16 | 4-$N(C_4H_9)_2$ | 4-$N(C_4H_9)_2$ | $CH_3$ | $OC_4H_9$ | deep blue |
| 17 | 4-$C_5H_{11}$ | 4-N($CH_3$)(3,4-di-$OCH_3$ phenyl) | $CH_3$ | OH/$OCH_3$ | very dark green |
| 18 | 4-Cl<br>2-Cl | 4-N($CH_3$)phenyl | $C_{12}H_{25}$ | $OCH_3$ | grass-green |
| 19 | 4-$OC_4H_9$ | 4-N($C_2H_5$)(2-$CH_3$, $C(CH_3)_2$...) | $C_4H_9$ | OH | green |
| 20 | 4-N—$CH_3$<br>3-$CH_3$<br>5-$CH_3$ | 4-N($CH_2$—$C_6H_5$)$_2$ | $CH_3$ | OH/$OC_2H_5$ | blue |
| 21 | 4-$C_{12}H_{25}$ | 4-N($C_2H_5$)(3-$CH_3$ pyrrolidinyl) | $C_{12}H_{25}$ | $OCH_3$ | dull green |

-continued

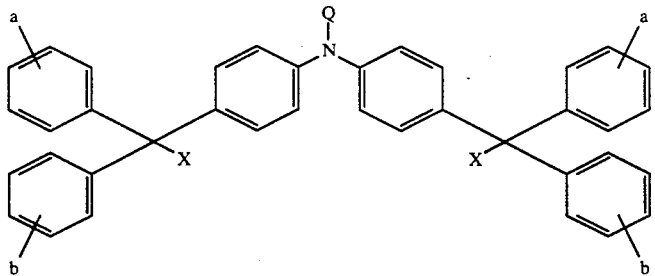

| Example | a | b | Q | X | Shade on acid clay |
|---|---|---|---|---|---|
| 22 | 4-N(CH₃)(CH₃), 3,4-diCH₃ phenyl | 4-N(C₆H₅)(CH₂—C₆H₅) | CH₂—C₆H₅ | OCH₃ | blue |

EXAMPLE 23

20.2 g (0.05 mol) of 9-ethyl-3,6-dibenzoylcarbazole and 18.7 g (0.13 mol) of phosphorus pentoxide, 98.5% pure, are suspended in 70.5 g (0.48 mol) of phosphorus oxychloride, and 12.1 g (0.1 mol) of N,N-dimethylaminobenzene are added slowly at room temperature. The mixture is stirred at 40° C. for 12 hours. The melt is poured into 400 ml of ice water, brought to a pH of 2 with 50% strength sodium hydroxide solution and stirred at room temperature for about 10 hours until the dyestuff precipitates in the form of crystals. It is filtered off with suction, washed with water and dried at 40° C. in vacuo to give 32.2 g (97.8% of theory) of metallic-bright crystals of melting point 215°–220° C.

32.6 g (0.05 mol) of this dyestuff are dissolved in 100 ml of dimethylformamide, and 12 g (0.15 mol) of 50% strength sodium hydroxide solution are slowly added at room temperature. After stirring at 30° C. for 1 hour, the brownish solution is poured into 1 l of ice water. After the addition of 50 g of sodium chloride, the colourless crystalline precipitate is filtered off with suction and dried at 40° C. in vacuo. Yield: 25.5 g (79% of theory) of an almost colourless crystalline powder of melting point 78°–80° C. and the formula:

In glacial acetic acid, a red-violet shade develops at a $\lambda_{max}$ of 588 nm and $\lambda_{max}$ of 504 nm having identical intensity.

Mass spectrum: $C_{44}H_{43}N_3O_2$ (645.8) m/e=645 (16%) M⁺, m/e=628 (14%) M⁺ —OH, m/e 525 (15%) M⁺ —C₆H₄N(CH₃)₂

A very dark red-violet shade of high colour strength and very good CF and CB stabilities and very good migration behaviour is obtained on acid clay or bisphenol A.

EXAMPLE 24

24.1 g (0.05 mol) of 9-ethyl-3,6-di(4-methoxybenzoyl)carbazole and 19.8 g (0.1 mol) of 9-ethylcarbazole are suspended in 70.5 g (0.48 mol) of phosphorus oxychloride, and 18.7 g (0.13 mol) of phosphorus pentoxide are added at room temperature. The reaction mixture is stirred at 70° C. for 18 hours and, after cooling it to 10°–15° C., it is stirred into 450 ml of methanol at such a rate that the temperature does not exceed 40° C. 200 ml of toluene are added and 200 g of 30% strength sodium methoxide solution are added dropwise to the dyestuff solution over a period of 1 hour. The mixture is stirred at 40° C. for 2 hours and then poured into 500 ml of water. The organic phase is separated off, and the solvent is removed at a water pump vacuum. 200 ml of methanol are added to the residue, and the mixture is stirred for a short period of time. The product is filtered off and dried at 30° C. in vacuo to give 33.6 g (76.2% of theory) of beige crystals of melting point 165°–67° C. and the formula

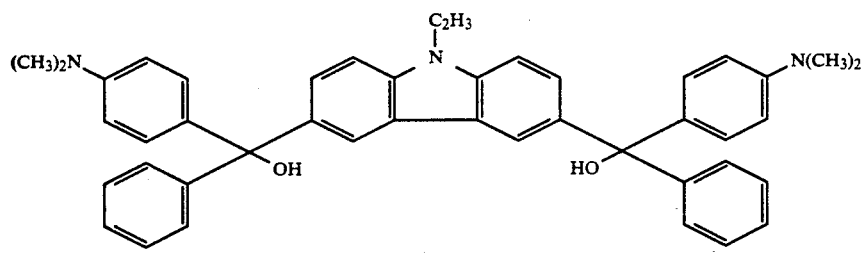

23

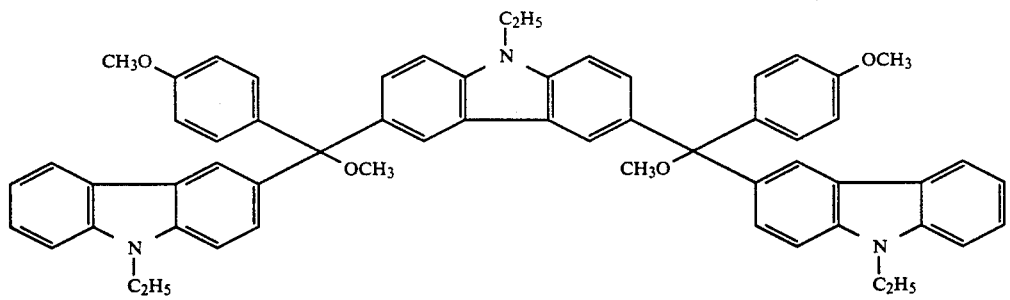

24

A solution in glacial acetic acid turns very dark violet at a $\lambda_{max}$ of 634 nm, $\lambda_2$ of 570 nm and $\lambda_3$ of 510 nm. Black-violet shades of high colour strength are obtained on acid clay or bisphenol A.

EXAMPLE 25

21.3 g (0.1 mol) of 1-ethyl-2,2,4-trimethyl-1,2,3,4-tetrahydroquinoline are slowly added dropwise at room temperature to a suspension of 20.2 g (0.05 mol) of 9-ethyl-3,6-di(benzoyl)carbazole and 18.7 g (0.13 mol) of phosphorus pentoxide, 98.5% pure, in 70.5 g (0.48 mol) of phosphorus oxychloride. The reaction mixture is heated to 60° C. and stirred at this temperature for 20 hours. The cooled melt is poured into 600 ml of ice water and stirred at room temperature for about 10-15 hours until the dyestuff precipitates in the form of crystals. The product is filtered off with suction and the still moist pressed cake is dissolved in 100 ml of dimethylformamide, and 20 g (0.15 mol) of 30% strength sodium hydroxide solution are slowly added at room temperature. After stirring at 40° C. for 2 hours, the reaction mixture is poured into 1 l of ice water. After the addition of 50 g of sodium chloride, the almost colourless crystalline precipitate is filtered off with suction. Drying at 40° C. in vacuo gives 34.5 g (85% of theory) of light grey crystals of melting point 126°–130° C. and the formula:

In glacial acetic acid, a blue-violet shade at a $\lambda_{max}$ of 609 nm and $\lambda_2$ of 514 nm having identical intensity develops.

A dull dark blue-violet shade of excellent CF and CB stabilities and very good migration behaviour is obtained on acid clay or bisphenol A.

EXAMPLE 26

20.8 g (0.05 mol) of 9-ethyl-3,6-di(benzoyl)carbazole and 18.7 g of phosphorus pentoxide are suspended in 76.8 g (0.5 mol) of phosphorus oxychloride, and 18.5 g (0.1 mol) of N-methyldiphenylamine are slowly added. The reaction mixture is stirred at 50° C. for 12 hours and, after cooling, poured into 400 ml of methanol at such a rate that the temperature does not exceed 50° C. 150 ml of toluene are added and 40 g (0.3 mol) of 30% strength sodium hydroxide solution are added dropwise to the dyestuff solution over a period of 1 hour. The mixture is stirred at 50° C. for 2 hours and then poured into 600 ml of water. The organic phase is separated off, and the solvent is removed in a water pump vacuum. 200 ml of methanol are added to the residue, and the mixture is stirred for a short period of time. The product is filtered off and dried at 30° C. in vacuo to give 25.7 g of a light beige crystalline powder of melting point 86°–90° C. and the formula:

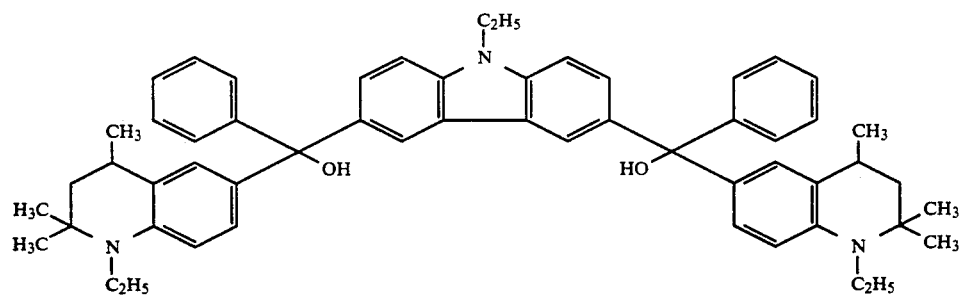

25

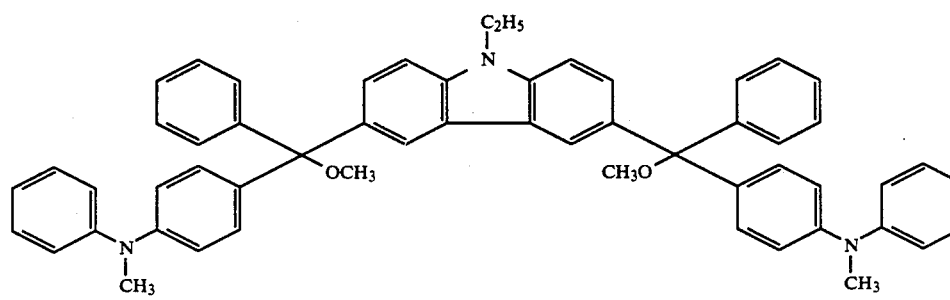

26

A solution in glacial acetic acid turns petroleum-blue at a $\lambda_{max}$ of 630 nm and $\lambda_2$ of 521 nm. A dull blue-grey shade develops on acid clay.

The following colour formers are also obtained by the method described in Examples 23 to 26:

wise at room temperature. The mixture is stirred at 70° C. for 10 hours, and the organic phase forming at the top is separated off. At a water pump vacuum of about 18–20 mbar and up to a temperature of 70° C., toluene and residual water are removed azeotropically from the ![Structure with carbazole core bearing N-Q substituent, flanked by two diphenylmethyl-X groups with phenyl substituents a and b]

| Example | a | b | Q | X | shade on acid clay |
|---|---|---|---|---|---|
| 27 | 4-OCH$_3$ | 4-OCH$_3$ | C$_2$H$_5$ | OH | reddish black-grey |
| 28 | 4-OCH$_3$ 3-OCH$_3$ | 4-OCH$_3$ | C$_8$H$_{17}$ | OH | dark black-violet |
| 29 | 4-SCH$_3$ 2-Cl | 4-N(C$_4$H$_9$)$_2$ | CH$_3$ | OC$_{12}$H$_{25}$ | brown-black |
| 30 | 4-C$_4$H$_9$-n | 4-N(CH$_3$)(4-ethylphenyl) | C$_6$H$_{13}$-n | OCH$_3$ | dull blue-green |
| 31 | 2-Cl | 4-N(C$_2$H$_5$)$_2$ | C$_2$H$_5$ | OC$_2$H$_5$ | blue |
| 32 | H | 4-N(C$_2$H$_5$)$_2$ 2-N(C$_2$H$_5$)$_2$ | CH$_3$ | OCH$_3$/OH | dark green |
| 33 | 4-N(C$_2$H$_5$)(C$_2$H$_4$Cl) | 4-N(C$_2$H$_5$)(C$_2$H$_4$Cl) | C$_2$H$_5$ | OH | deep blue |
| 34 | 4-OCH$_2$—C$_6$H$_5$ | 3-N(CH$_3$)(1-phenylethyl) | C$_4$H$_9$ | OH | dull blue-violet |

EXAMPLE 35

40.6 g (0.13 mol) of 9-ethyl-3-benzoylcarbazole and separated organic phase to give 85.2 g (90.4% of theory) of an ochre crystalline powder of melting point 98°–102° C. and the formula:

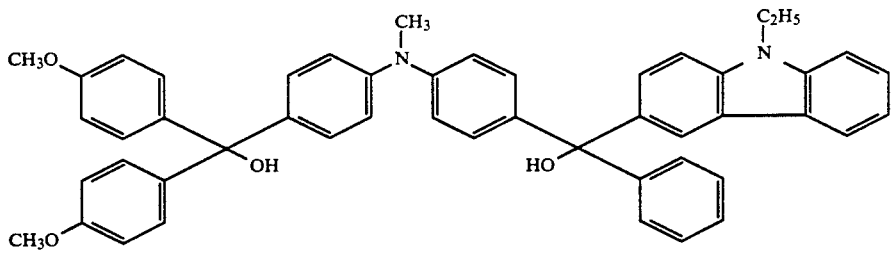

24.1 g (0.17 mol) of phosphorus pentoxide are suspended in 144 g (0.94 mol) of phosphorus oxychloride. 24 g (0.13 mol) of N-methyldiphenylamine are slowly added dropwise at room temperature. The mixture is stirred at 50° C. for 3 hours, and 32 g (0.13 mol) of 4,4'-dimethoxybenzophenone are then added in portions. The resulting melt is stirred at 50° C. for another 5 hours, poured into 800 ml of ice water, and 300 ml of toluene are added. 66.7 g (0.5 mol) of 30% strength sodium hydroxide solution are then slowly added dropwise at Black-grey shades of high colour strength and very good CF and good CB stability are obtained on acid clay and salicylate.

EXAMPLE 36

5 g of the colour former of Example 1 are dissolved in a mixture of 60 g of dodecylbenzene and 40 g of chlorinated paraffin having a Cl content of 45%. 223 g of such a solution are mixed with 39.5 g of the oxadiazinetrione of Desmodur H (NCO content 20.5%). This is followed by mixing with 320 g of 0.5% strength polyvinyl alcohol solution and emulsifying in the shear gradient of a rotor/stator emulsifier. The mixture is crosslinked with 76 g of 9.0% strength diethylenetriamine solution. The after-treatment is carried out by heating the dispersion to 60° C. and stirring it at 60° C. for 3 hours. A dispersion containing 40% of capsules and having a capsule size of 7.3 μm is obtained.

250 ml of this dispersion are initially introduced, and 40 g of finely ground cellulose (Arbocell BE 600/30 from Rettenmeier & Söhne) are slowly poured in with vigorous stirring. After vigorous stirring for at least 30 minutes, 40 ml of 50% strength SBR latex (Baystal P 1600 from Bayer AG) are added. The resulting 48.5% strength brushing paint is diluted with water to a solids content of 30% and applied to the back of a commercial base paper with an airbrush. After drying, the coating thickness is 5 g/m².

The paper brush-coated in this manner is placed with the coated side on the side of a commercial no-carbon copying paper which is coated with developer substance. When pressure is applied by writing to the paper coated with capsules, a red-violet copy which has very good light fastness is produced on the copying paper.

EXAMPLE 37

The procedure of Example 36 is repeated, using 5 g of the colour former of Example 3, to give a paper coated with microcapsules, which in an analogous manner affords a deep dark-green copy which also has very good light fastness.

I claim:

1. Compounds of the general formula

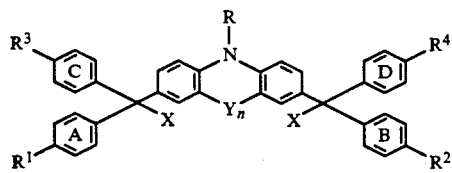

in which—independently of one another
  X is hydroxyl, alkoxy, alkenyloxy, aralkoxy, cycloalkoxy, aryloxy, acyloxy, alkylamino, dialkylamino, acylamino, aralkylamino or arylamino,
  Y is a direct bond, oxygen, sulphur or N-R,
  R is alkyl, alkenyl or aralkyl,
  $R^1$ and $R^2$ are alkoxy, aralkoxy, aryloxy or a radical of the formula

$R^3$ and $R^4$ are hydrogen, halogen, alkyl, alkoxy, aralkyl, aralkoxy, aryloxy or a radical of the formula

$Z^1$ and $Z^2$ are alkyl, aryl, cycloalkyl or aralkyl and n is 0,
  it being possible for further isocyclic rings to be fused with rings A, B, C and D and for the cyclic and acyclic radicals and rings A, B, C and D to carry further nonionic substituents customary in dyestuff chemistry.

2. Compounds of the formula

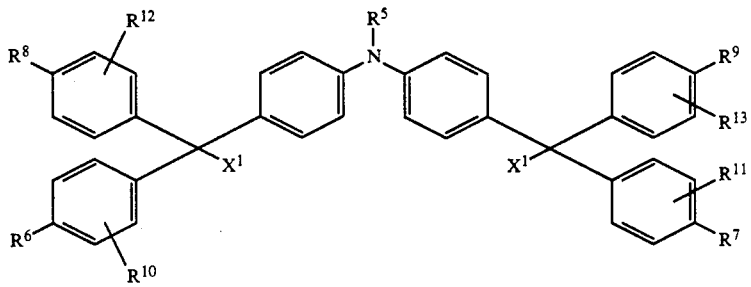

in which—independently of one another
  $X^1$ is hydroxyl, $C_1$-$C_{12}$-alkoxy or benzyloxy which is unsubstituted or substituted by $C_1$-$C_4$-alkoxy or chlorine,
  $R^5$ is $C_1$-$C_{12}$-alkyl or benzyl,
  $R^6$ and $R^7$ are unsubstituted or chlorine-, $C_1$-$C_4$-alkoxy-substituted $C_1$-$C_{12}$-alkoxy, benzyloxy, phenoxy or a radical of the formula

$R^8$ and $R^9$ are hydrogen, chlorine, unsubstituted or chlorine- or $C_1$-$C_4$-alkoxy- substituted $C_1$-$C_{12}$-alkyl, unsubstituted or chlorine- or $C_1$-$C_4$-alkoxy-substituted $C_1$-$C_{12}$-alkoxy, benzyl, phenoxy or a radical of the formula

$R^{10}$, $R^{11}$, $R^{12}$ and $R^{13}$ are hydrogen, chlorine, $C_1$-$C_{12}$-alkyl, $C_1$-$C_{12}$-alkoxy, phenoxy, benzyloxy or a radical of the formula

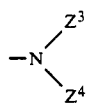

$Z^3$ and $Z^4$ are unsubstituted or chlorine-, cyano-, $C_1$-$C_4$-alkoxycarbonyl-or $C_1$-$C_4$-alkoxy-substituted $C_1$-$C_{12}$-alkyl, cyclohexyl, phenyl or benzyl, which can be substituted by chlorine, $C_1$-$C_{12}$-alkyl or $C_1$-$C_{12}$-alkoxy.

3. Compounds of the formula

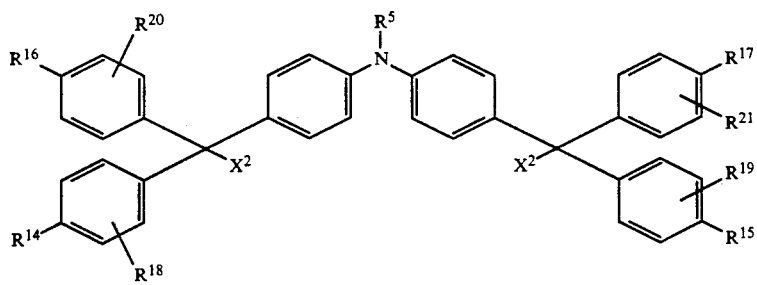

in which—independently of one another
$X^2$ is hydroxyl or $C_1$-$C_{12}$-alkoxy,
$R^{14}$ and $R^{15}$ are $C_1$-$C_{12}$-alkoxy, benzyloxy or a radical of the formula

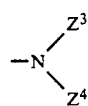

$R^{16}$ and $R^{17}$ are hydrogen, chlorine, $C_1$-$C_{12}$-alkyl, $C_1$-$C_{12}$-alkoxy, benzyloxy or a radical of the formula

—N⟨$Z^3$/$Z^4$⟩

$R^{18}$, $R^{19}$, $R^{20}$ and $R^{21}$ are hydrogen, chlorine, $C_1$-$C_{12}$-alkyl, $C_1$-$C_{12}$-alkoxy, $C_1$-$C_4$-alkylamino or di-$C_1$-$C_4$-alkylamino in which
$R^5$ is $C_1$-$C_{12}$-alkyl or benzyl, and
$Z^3$ and $Z^4$ are unsubstituted or chlorine-, cyano-, $C_1$-$C_4$-alkoxycarbonyl-or $C_1$-$C_4$-alkoxy-substituted $C_1$-$C_{12}$-alkyl, cyclohexyl, phenyl or benzyl, which can be substituted by chlorine, $C_1$-$C_{12}$-alkyl or $C_1$-$C_{12}$-alkoxy.

4. Compounds according to claim 1, characterized in that they are symmetrical.

5. Compound of the formula

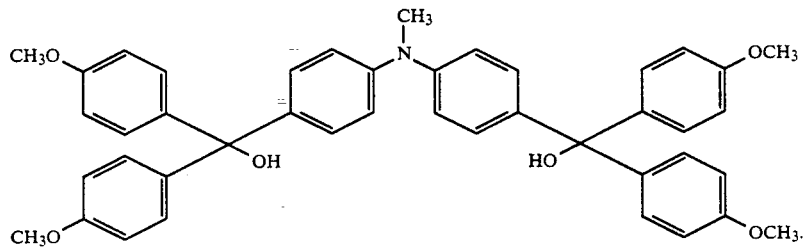

* * * * *